United States Patent [19]

MacDougall, Jr.

[11] 4,012,785
[45] Mar. 15, 1977

[54] MAGNETIC RECORDING PLAYBACK CIRCUIT

[75] Inventor: David L. MacDougall, Jr., San Jose, Calif.

[73] Assignee: Shugart Associates, Inc., Sunnyvale, Calif.

[22] Filed: Feb. 13, 1976

[21] Appl. No.: 657,714

[52] U.S. Cl. .................................. 360/43; 360/51
[51] Int. Cl.² .......................................... G11B 5/00
[58] Field of Search ..................... 360/40, 43, 51

[56] References Cited

UNITED STATES PATENTS

| | | | |
|---|---|---|---|
| 3,404,391 | 10/1968 | Chur ................................ | 360/43 |
| 3,577,192 | 5/1971 | Schlaeper ........................ | 360/40 |
| 3,581,297 | 5/1971 | Behr et al. ....................... | 360/40 |
| 3,623,040 | 11/1971 | Erikson ............................ | 360/43 |
| 3,699,554 | 10/1972 | Jones ............................... | 360/43 |
| 3,711,843 | 1/1973 | Galvagni et al. ................. | 360/43 |

Primary Examiner—Vincent P. Canney
Attorney, Agent, or Firm—Boone, Schatzel, Hamrick & Knudsen

[57] ABSTRACT

A playback circuit for use with a magnetic recording transducer, in a magnetic recording apparatus, the transducer developing an alternating current readback signal having alternating positive and negative peaks, the playback circuit comprising a differentiator responsive to the readback signal and operative to produce a differentiated signal having first and second polarities and having zero crossings in time coincidence with the positive and negative peaks, a bidirectional one-shot device responsive to the differentiated signal and operative to produce a first bistate signal having transitions in time coincidence with the zero crossings and to produce a second signal comprising a sequence of pulses having leading edges that correspond in time to the zero crossings and having trailing edges that lag the leading edges by a predetermined time interval, a latch for producing a third signal having transitions that correspond in time to the trailing edges and having a level that corresponds to the level of the first signal at such time, and for producing a fourth signal that is the complement of the third signal, two one-shot devices responsive to the third and fourth signals and operative to produce fifth and sixth signals including pulses corresponding to the positive going transitions of the third and fourth signals, and an OR gate operative to conduct the pulses to an output terminal, the conducted pulses corresponding to the positive and negative peaks of the readback signal.

10 Claims, 2 Drawing Figures

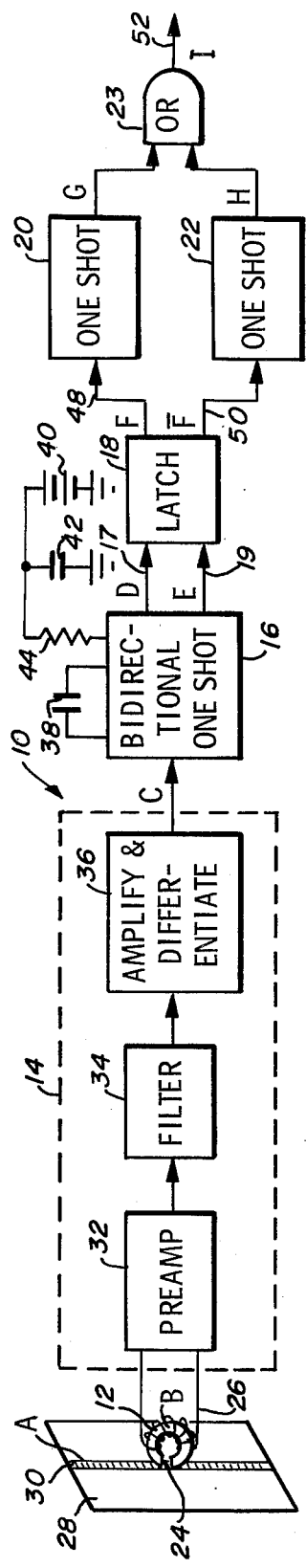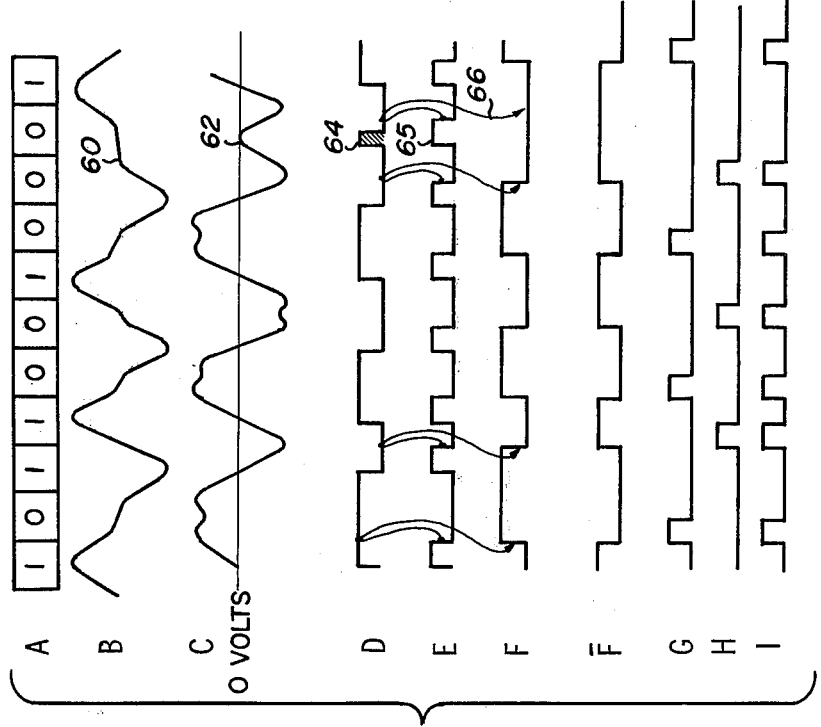

MAGNETIC RECORDING PLAYBACK CIRCUIT

BACKGROUND OF THE INVENTION

1. Field of the Invention

The present invention relates generally to magnetic recording systems, and more particularly, to an improved playback circuit which is not subject to a differentiated droop problem.

2. Discussion of the Prior Art

In magnetic recording systems the reading operation in binary recording is concerned with the reconstruction of the original binary input data from the output voltage waveform. Such systems require that each written bit must be properly detected and that false bits must not be interpreted as written bits. Functionally, several detection techniques are available for use in magnetic recording systems.

In one detection scheme the output amplitude of a signal received by a magnetic transducer is sensed. When the level of such signal exceeds a fixed threshold voltage, the presence of a pulse is recognized and the clock timing associated with the signal is resynchronized in a prescribed manner from that time instant. However, in this scheme due to pulse crowding, etc., the signal waveform changes. This causes the instantaneous peak value of the received voltage to occur at varying positions relative to the leading edge of the output pulse. Consequently, the time interval between bits is also caused to vary which is disadvantageous in that the generated clock varies considerably from an optimum timing reference.

In another type of detection scheme, the readback signal is differentiated so that when a peak occurs and the slope changes polarity, the differentiated signal passes through a "zero" reference level. In general, the differentiation approach provides a fairly accurate determination of pulse peak locations. Hence, for a non-perturbed readback signal, pulse timing rather than pulse amplitude determines bit density performance.

An important factor relative to the detection scheme implemented is the code which is used to record or write the data on the tracks of the magnetic media, such as disks, tapes or the like. Presently several codes are available. The most commonly used codes are the frequency modulation (FM) code and the modified frequency modulation (MFM) code. Another code which has been developed but has found only limited use in magnetic recording systems for reasons which will be subsequently described is the modified MFM ($M^2FM$) code.

In the FM code, commonly referred to as the "double frequency" code, data bits are written at the leading edge of a bit cell if the bit cell contains a binary unit. Clock bits are written at the leading edge of each bit cell for both binary "one" or "zero". It should be noted that when the FM code is utilized, the detected signal comprises the frequencies $f$ and $2f$.

MFM encoding was developed to reduce the high upper frequency required for providing a given amount of data. Data bits are written in the center of a bit cell if the bit cell contains a binary "one". Clock bits are written at the leading edge of a bit cell if the previous bit cell and the present bit cell contain binary "zeros". The frequencies associated with the MFM code are $f$, $f/3$ and $2f$.

At high packing densities where the data bits are spaced closer together, "bit shift" adversely affects MFM. As magnetically recorded transitions are brought closer together, a magnetic read head will detect both the transition over which it is passing, and the immediately preceding and following transitions, if they are close to the transition being read. Since the transitions alternate in direction, detection of a preceding or following transition subtracts in amplitude from the transition being read. In addition, if only one of the adjacent transitions is close to the transition being read, the subtraction is not symmetrical. Since the amount of subtraction is inversely dependent upon the distance between the transitions, the detection signal for the transition being read will be reduced only on one side. The peak of the detection signal is thus effectively shifted away from the closest adjacent transition. This phenomenon is called "bit shift".

Bit shift may have a disastrous effect upon the separation of MFM information by self-clocking detection circuitry. For example, if a plurality of "ones" are followed by three or more "zeroes", the first clock transition occurs one and one-half bit cells after the last "one" transition and the next clock transition occurs only one bit cell later. The next clock will therefore affect a bit shift on the first clock transition away from the next clock. Hence, the first clock transition encountered by the data separator after a series of "ones" is caused to be erroneously positioned early. The incorrectly positioned clock bit may therefore be erroneously detected as a data bit. Hence, the self clocking circuitry will assume that the detected bit is a late data bit rather than an early clock bit. The timing adjustment is thereby altered erroneously and the system is thrown out of proper timing relationship.

In an attempt to avoid the difficulties encountered in a self clocking code due to bit shift and yet allow recording at relatively high data densities the $M^2FM$ code was developed. In the $M^2FM$ code, data bits are written at the center of the bit cell if the bit cell contains a binary "one". Clock bits are written at the leading edge of the bit cell if the previous bit cell did not contain a written transition and the present bit cell contains a binary "zero".

A more complete description of the method and apparatus for communication and storage of binary information in accordance with the $M^2FM$ code is contained in U.S. Pat. No. 3,560,947, to Robert C. Franchini. It should be recognized that the $M^2FM$ code includes the frequencies $4/5f$, $f$, $4/3f$ and $2f$, one of which (i.e., $4/5f$) is lower than the lowest frequency occuring in the FM or the MFM codes.

However, one of the problems associated with $M^2FM$ code is that the $4/5f$ signal tends to cause false detection of bits. For example, at $4/5f$ the bits are farther apart than they are at $f$. Consequently, the analog readback signal developed by the magnetic transducer in the magnetic recording apparatus tends to include a shoulder. Typically when such a shoulder occurs, it produces a "droop" in the signal level obtained after the readback signal is differentiated. Since the detector in the playback circuit senses zero crossings of the readback signal, should such a droop approach zero or the detection threshold level, a false bit may be produced.

This problem associated with the development of a false bit occurs primarily in disk drives since the bit density of the information stored on the inside track of a magnetic recording disk is greater than that stored on the outside track due to the difference in circumference between the inside and outside tracks. As a result of the greater spacing between the bits stored on the outside track, the readback signal tends to include shoulders and hence is subject to the previously mentioned "differentiated droop problem" upon the differentiation of such signal.

SUMMARY OF THE PRESENT INVENTION

It is therefore a primary object of the present invention to provide a playback circuit for use in a magnetic recording apparatus that is not subject to a differentiated droop problem.

Another object of the present invention is to provide a playback circuit which may be used in magnetic recording systems that employ the FM, MFM, and M²FM codes.

Yet another object of the present invention is to provide a playback circuit which may be used with magnetic disks of larger diameter and having relatively large ratios of bit density between the inside and outside tracks without encountering problems due to shouldering on the outside tracks.

Still another object of the present invention is to provide a playback circuit which lends itself for use in detection of binary information characterized by the M²FM code where the bits are spaced apart by relatively long time intervals.

Briefly, the preferred embodiment of the present invention includes a differentiator responsive to a readback signal having positive and negative peaks and operative to produce a differentiated signal having first and second polarities and having zero crossings in time coincidence with the positive and negative peaks, a bidirectional one-shot device responsive to the differentiated signal and operative to produce a first bistate signal having transitions in time coincidence with the zero crossings and to produce a second signal comprising a sequence of pulses having leading edges that correspond in time to the zero crossings and having trailing edges that lag the leading edges by a predetermined time interval, a latch for producing a third signal having transitions that correspond in time to the trailing edges and having a level that corresponds to the level of the first signal at such time, and for producing a fourth signal that is the complement of the third signal, two one-shot devices responsive to the third and fourth signals and operative to produce fifth and sixth signals including pulses corresponding to the positive going transitions of the third and fourth signals, and an OR gate operative to conduct the pulses to an output terminal, the conducted pulses corresponding to the positive and negative peaks of the readback signal, but lagging them by the predetermined time interval.

The principal advantages of the present invention are that it recreates a binary signal without introducing false bits and that it is not subject to a differentiated droop problem.

Another advantage of the present invention is that it serves to detect binary information encoded by the FM, MFM, and M²FM schemes where the bits are spaced apart by relatively long time intervals.

Yet another advantage of the present invention is that it can be used with magnetic disks of larger diameter and having relatively large ratios of bit density between the inside and outside tracks without encountering problems due to shouldering on the outside tracks.

These and other objects and advantages of the present invention will no doubt become apparent to those of ordinary skill in the art after having read the following detailed description of the preferred embodiment which is illustrated in the several figures of the drawing.

In the drawing:

FIG. 1 is a block diagram generally illustrating the principal components of a playback circuit in accordance with the present invention; and FIG. 2 is a timing diagram used to schematically illustrate operation of the playback circuit shown in FIG. 1.

DETAILED DESCRIPTION OF THE PREFERRED EMBODIMENT

Referring to FIGS. 1 and 2 of the drawings, a playback circuit 10 is shown in block diagram form in accordance with the present invention. The circuit 10 comprises a magnetic recording transducer 12, a wave shaping circuit 14, a bidirectional one-shot device 16, a latch 18, two retriggerable resettable monostable multivibrators 20 and 22 and an OR gate 23.

The magnetic recording transducer 12 includes a read/write gap 24 and an energizing coil 26 and serves to read (or write) information from a magnetic medium 28 in a manner well known to those skilled in the art when the gap 24 is moved relative to the medium 28. The magnetic medium 28 may be a disk, tape or the like and includes tracks 30 of information in the form of magnetically-recorded bits thereon.

In the preferred embodiment, the transducer 12 is one capable of processing high frequency signals and by way of example may be one as described in detail in U.S. Pat. No. 3,864,752, entitled "Magnetic Head Assembly Having A Slotted Body Portion of the Elastic Material For Clamping A Transducer And Method of Manufacture Therefor", by Herbert E. Thompson.

The wave shaping circuit 14 includes a preamplifier 32, a filter 34, and an amplifier and a differentiator 36. The preamplifier 32 includes those components necessary to perform the normal preamplification functions. The filter 34 is likewise comprised of ordinary filter components and serves to remove noise from the amplified readback signal. The differentiator 36 is capable of amplifying and differentiating the filtered signal into a differentiated readback signal.

The bidirectional one-shot device 16 has outputs 17 and 19, and includes those integrated circuit components required to convert an alternating current signal into a first bistate signal having a high state when the alternating current signal has one polarity and having a low state when the alternating current signal has the other polarity, and into a second signal which includes a pulse at each time the first signal transitions between states. A capacitor 38 is connected between two terminals of the device and a source of direct current voltage 40 having its positive terminal connected to one end of a filter capacitor 42 and through a timing resistor 44 to another terminal of the device 16. The other ends of the capacitor 42 and the source 40 are connected to ground. The capacitor 38 and resistor 44 serve to extend the width of the pulses of the second signal to a preselected time duration.

In the preferred embodiment the bidirectional one-shot device is a device manufactured by the Signetics Corporation and designated by them as the 8T20. Such a device comprises a high speed analog comparator, digital control circuitry and a precision monostable multivibrator.

The latch 18 or dual flip-flop, includes output terminals 48 and 50, and comprises ordinary integrated circuit components. The latch 18 is capable of responding to a first bistate signal and a second bistate signal comprising a sequence of pulses, each with its leading edge occurring at a time corresponding to each transition of the first bistate signal and its trailing edge occurring at a time prior to the next transition of the first signal and is operative to produce on output terminal 48 a third bistate signal having transitions at times corresponding to the occurrence of each trailing edge of the pulses forming the second bistate signal and having a level just after each transition which corresponds to the level of the first bistate signal and to produce on output terminal 50 a fourth bistate signal that is the complement of the third bistate signal produced on terminal 48.

In the preferred embodiment the latch 18 is a dual D-type, edge-triggered flip-flop manufactured by the Signetics Corporation and designated by them as the N7474. Such a device is a monolithic integrated circuit having direct clear and preset inputs and complementary outputs.

The retriggerable resettable monostable multivibrator 20 is connected to the output terminal 48 and the multivibrator 22 is connected to the output terminal 50. The multivibrators 20 and 22 are identical in structure and comprise ordinary integrated circuit components capable of converting a positive-going transition into a pulse.

In the preferred embodiment the multivibrators 20 and 22 are included in a single integrated circuit package manufactured by the Fairchild Camera and Instrument Company and designated by them as the 9602, Dual Retriggerable Resettable Monostable Multivibrator.

The OR gate 23 includes input terminals connected to the outputs of the multivibrators 20 and 22 and an output terminal 52. The OR gate 23 serves to produce an output signal on terminal 52 whenever signals are present on either of its inputs.

Referring to FIG. 2, the waveforms of the signals encountered at various points in the playback circuit of the present invention are illustrated. For purposes of illustration, it is assumed that the detection scheme is based on the M²FM code. As previously described, in the M²FM code, binary "ones" are interpreted in selected bit cells when a written transition occurs at the center of the bit cell. Binary "zeros" are interpreted in all other bit cells. However, it will be recognized that the playback circuit 10 can be used in magnetic recording apparatus which employs the FM or the MFM codes.

FIG. 2A represents the data that is written in a sequence of bit cells and comprises the binary digits 1011001001. FIG. 2B represents the waveform of the readback signal developed by the magnetic recording transducer 12 when its transducing gap 24 is positioned over a track 30 having the binary sequence of FIG. 2A stored thereon and the track is moved relative to the gap. As shown, this signal is an alternating current signal having positive and negative peaks as well as zero crossings and a shoulder 60. FIG. 2C represents the waveform of the differentiated readback signal developed at the output of the amplifier and differentiator 36 and includes zero crossings corresponding to the time occurrence of the positive and negative peaks of the readback signal. In addition, when the shoulder 60 occurs, the differentiated signal resembles a droop and approaches zero as shown by the numeral 62. It should be recognized that the presence of even a slight amount of electrical noise on the droop portion of the differentiated readback signal will cause the signal to pass through zero and hence be interpreted as a false bit. FIG. 2D illustrates the waveform of the first bistate signal developed by the bidirectional one-shot device 16 on its output 17. This signal has a high level when the differentiated signal is positive, a low level when it is negative and changes state at each zero crossing. As shown, the signal includes a high level 64 at a time corresponding to the duration of the differentiated droop 62 which could be interpreted as a false bit in conventional detection methods. FIG. 2E represents the waveform of the second bistate signal developed by the bidirectional one-shot device 16 on its output 19. The signal includes a sequence of pulses each having a leading edge corresponding to the time occurrence of the zero crossings of the waveform of FIG. 2C and a false pulse 65. FIG. 2F and FIG. 2F̄ represent the complementary waveforms developed on the outputs of the latch 18 and include transitions at times corresponding to the trailing edges of the pulses of FIG. 2E. FIGS. 2G and 2H represent the waveforms of the pulse signals corresponding to the transitions of FIGS. 2F and 2F̄ respectively. FIG. 2I illustrates the raw data signal produced at the output of the OR gate 23.

In operation, with the playback circuit 10 properly biased for operation, the magnetic media 28 is moved such that the track 30 is continuously moved past the transducing gap 24 so as to provide the alternating current readback signal shown in FIG. 2B across the coil 26. The readback signal is amplified by the preamplifier 32 and applied to the filter 34 which removes high frequency noise from the amplified signal. The filtered signal is next amplified and differentiated by the differentiator 36 so as to provide the differentiated signal shown in FIG. 2C having zero crossings corresponding to the positive and negative peaks of the readback signal and the droop 62 corresponding to the shoulder caused by the long duration between peaks. In response to the alternating current differentiated signal the bidirectional one-shot device 16 develops the first bistate signal shown in FIG. 2D on its output 16 and also the second bistate signal shown in FIG. 2E on its output 19. The first bistate signal has a high state when the differentiated signal is positive, a low state when it is negative, and has transitions when it passes through zero. Because of noise, when the droop occurs the first bistate signal is shown to include a change of state 64 which is likely to be interpreted as a data bit in conventional detection methods. The second bistate signal comprises a sequence of pulses having leading edges at each transition of the first bistate signal. The width of such pulses is determined by the time constant associated with capacitor 38 and resistor 44, and is approximately one-half the minimum bit to bit time of the encode used.

With the first and second bistate signals applied to the latch 18, the latch 18 is clocked by the trailing edges of the pulses of the second bistate signal, samples the level of the first bistate signal at that time and produces complementary signals as illustrated in FIGS. 2F and 2F̄ on its outputs 48 and 50, respectively. The signals of FIG. 2F includes transitions at times corresponding to the trailing edge of the pulses of FIG. 2E and has a level equal to the level of the first bistate signal at that time. Since the trailing edge of the false pulse 65 resulting from the differentiated droop occurs after the trailing edge of high level 64, waveform 2F remains low as indicated by the arrow 66. Hence, when the false bit occurs, the state of the latch is not changed.

With the signal of FIG. 2F applied to the one-shot 20, the string of pulses shown in FIG. 2G and corresponding in time to each positive transition of FIG. 2F is produced. Similarly, the one-shot 22 serves to produce the string of pulses shown in FIG. 2H. The OR gate 23 produces on its output terminal 52 the raw data signal shown in FIG. 2I. This signal is delayed slightly by the duration of the clocking pulse from the signal of FIG. 2E.

Therefore, the playback circuit 10 has operated to preclude the interpretation of false bits caused by differentiated droop as data, and has transmitted on its output terminals only the data that was actually written on the magnetic media.

From the above it should be recognized that data written on a magnetic media in any one of a number of codes is able to be detected without the introduction of any false bits due to differentiated droop with the system of the present invention.

While the invention has been particularly shown and described with reference to a certain preferred embodiment, it will be understood by those skilled in the art that various alterations and modifications in form and detail may be made therein. Accordingly, it is intended that the following claims cover all such alterations and modifications as fall within the true spirit and scope of the invention.

What is claimed is:

1. A playback circuit for use with a magnetic recording transducer in a magnetic recording apparatus, said transducer developing an alternating current readback signal having alternating positive and negative peaks, said playback circuit comprising:
   first means responsive to said readback signal and operative to produce a differentiated signal having first and second polarities and having zero crossings at each transition between said first and second polarities in time coincidence with said positive and negative peaks;
   second means responsive to said differentiated signal and operative to produce a first signal having a first level when said differentiated signal has said first polarity, a second level when said differentiated signal has said second polarity and transitions in time coincidence with said zero crossings, said second means being further operative to produce a second signal comprising a sequence of pulses having leading edges that correspond in time to said zero crossings and having trailing edges that lag said leading edges by a predetermined time interval; and
   third means responsive to said first and second signals and operative to produce a third signal having transitions that correspond in time to said trailing edges and having a level that corresponds to the level of said first signal at such time, said transitions of said third signal corresponding to the positive and negative peaks of said readback signal, and lagging such peaks by said predetermined time interval.

2. A playback circuit as recited in claim 1 wherein said second means includes a timing circuit having a time constant which is selected to provide said predetermined time interval.

3. A playback circuit as recited in claim 2 wherein said second means is a bidirectional one-shot device.

4. A playback circuit as recited in claim 2 wherein said third means includes a latch circuit which is responsive to the first and second signals and produces complementary signals having transitions that correspond in time to the trailing edges of the second signal and have levels that correspond to the level of the first signal at such time and a pair of one-shot devices responsive to said complementary signals and operative to produce said third signal.

5. A playback circuit for use with a magnetic recording transducer in a magnetic recording apparatus, said transducer developing an alternating current readback signal having alternating positive and negative peaks, said playback circuit comprising:
   first means responsive to said readback signal and operative to produce a differentiated signal having first and second polarities and having zero crossings at each transition between said first and second polarities in time coincidence with said positive and negative peaks;
   second means responsive to said differentiated signal and operative to produce a first signal having a first level when said differentiated signal has said first polarity, a second level when said differentiated signal has said second polarity and transitions in time coincidence with said zero crossings and being further operative to produce a second signal comprising a sequence of pulses having leading edges that correspond in time to said zero crossings and having trailing edges that lag said leading edges by a predetermined time interval;
   third means responsive to said first and second signals and operative to produce a third signal having transitions that correspond in time to said trailing edges and having a level that corresponds to the level of said first signal at such time, and being further operative to produce a fourth signal that is the complement of said third signal;
   fourth means responsive to said third signal and operative to produce a fifth signal including pulses corresponding to the first and to each alternative transition of said third signal;
   fifth means responsive to said fourth signal and operative to produce a sixth signal including pulses corresponding to the second and to each alternative transition of said fourth signal; and
   sixth means having an output terminal and being responsive to said fifth and sixth signals and operative to conduct said pulses to said output terminal, the conducted pulses corresponding to the positive and negative peaks of said readback signal.

6. A playback circuit as recited in claim 5 wherein said readback signal includes noise, and further comprising wave-shaping means preceding said first means, said wave-shaping means serving to remove said noise from said readback signal.

7. A playback circuit as recited in claim 6 wherein said wave-shaping means comprises a preamplifier for amplifying said readback signal, and a filter for removing noise from the amplified readback signal.

8. A playback circuit as recited in claim 5 wherein said second means includes a timing circuit having a time constant which is selected to provide said predetermined time interval.

9. A playback circuit as recited in claim 5 wherein said third means is a latch circuit, said fourth and fifth means are one-shot devices and said sixth means is an OR gate.

10. A playback circuit as recited in claim 5 and further comprising a magnetic transducer capable of sensing changes in magnetic flux stored on a magnetic medium, said transducer having output terminals that are connected to said first means, and further serving to convert said changes in magnetic flux into said readback signal and provide same on said output terminals.

* * * * *